Figure 1:
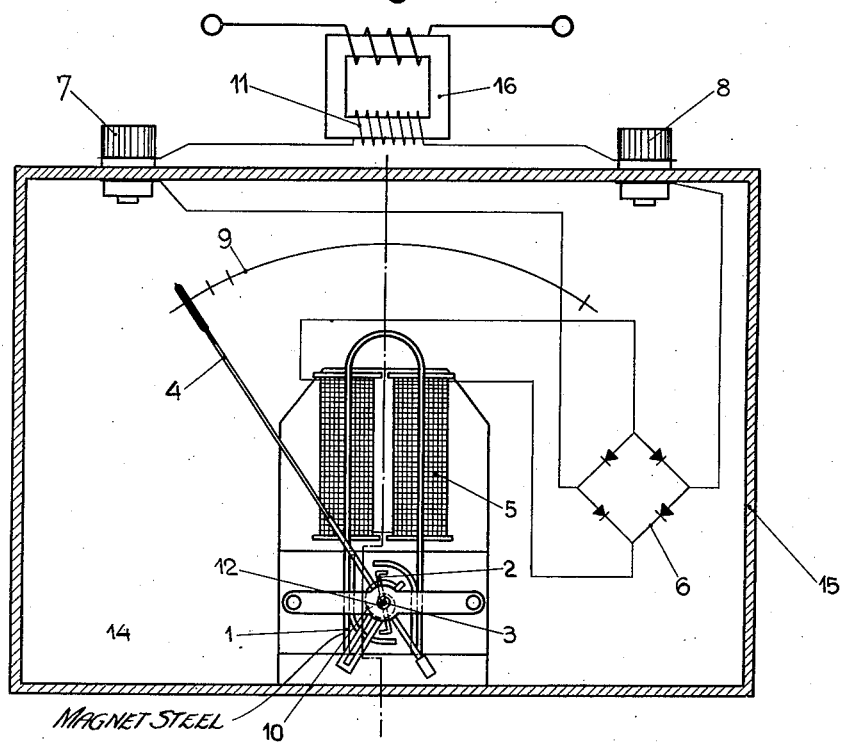

Aug. 22, 1939.  E. REICH  2,170,597

ELECTRICAL MEASURING INSTRUMENT

Filed April 1, 1937

Inventor:
Ernest Reich

Patented Aug. 22, 1939

2,170,597

UNITED STATES PATENT OFFICE 2,170,597

ELECTRICAL MEASURING INSTRUMENT

Ernest Reich, Budapest, Hungary

Application April 1, 1937, Serial No. 134,434
In Hungary April 2, 1936

3 Claims. (Cl. 171—95)

The invention relates to instruments for measuring or indicating abnormal transient alternating currents. It is of considerable importance for the control of the output of an A. C. plant, switchgear, cables at networks and the like, that a direct measurement or indication of the abnormal current and maximum short circuit currents occuring therein should be possible. Instruments capable of performing such functions have not heretofore been known.

The object of the present invention is to provide a simple instrument which will give directly, that is, without calculation or manipulation of different parts, a reasonably accurate indication or measurement of the value of the abnormal A. C. currents.

According to the invention, an instrument for measuring abnormal transient alternating currents, such as are caused by short circuits, overloads, and the like, comprises a magnetic flux path including remanent material, said remanent material being adapted to actuate a moving iron armature in accordance with the magnetic polarisation therein to give an indication of the previous highest current which has affected the flux path subsequent to a demagnisation of the material, and being provided with at least one winding adapted to be fed with current derived from a said abnormal transient current, a rectifier being inserted in the circuit of said winding to rectify the said derived current.

Thus if the instrument according to the invention is applied either permanently or temporarily to a circuit, the remanent material will be magnetised by any change in the abnormal current flowing in the circuit and when the circuit is normal or currentless, the amount of remanence in the material will depend upon the highest peak current which has flowed in the circuit. Indicating means associated with the armature will be actuated in accordance with this remanence and so will give an indication, or, if it is suitably calibrated, a measurement, of that peak current.

In order to use the instrument with an alternating current circuit, the remanent material may be provided with one or more windings adapted to be fed with current derived from said circuit and a rectifier is provided to rectify this derived current. The A. C. side of the rectifier will usually be connected with the secondary circuit of a current transformer in the circuit to be tested.

The drawing shows one embodiment of my invention.

Figure 1 being a part sectional and part diagrammatic front view, and

Figure 2:
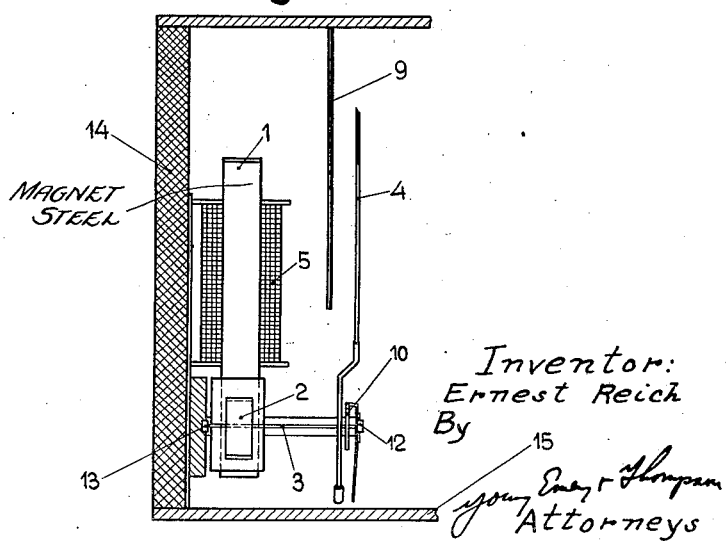

Fig. 2 being a sectional view taken on line 2—2 of Fig. 1.

Referring to Figs. 1 and 2 the instrument is provided with a preferably U-shaped steel strip, 1, the ends of which are bent as shown on Fig. 1 for the purpose of obtaining suitable scale divisions 9. At the ends of said strip to form pole pieces and an air gap a moving iron armature 2 is pivoted at 3 and controlled by a coil spring 10. The armature carries a pointer 4.

The steel strip 1, is provided with windings or coils 5, preferably connected in series. The coils are connected to the D. C. side of the rectifier 6.

The A. C. side of the rectifier is connected through the terminals 7, 8, to the secondary coil 11 of a current transformer 16. For measuring abnormal current load in the circuit of the transformer 16, the calibration of the instrument is made such, that the pointer 4 shows practically no indication at normal load and only begins to indicate when the load exceeds about 1.5 times normal load.

For example: If the normal load is 50 Amps. in an A. C. high tension plant the scale 9 of the instrument is divided only from 75–500 Amps.

The scale divisions are calibrated as follows. A load of 300 Amps. for example, is impressed on the primary coil of transformer 16, whereby the steel strip 1 will be magnetised by the resulting rectifier direct current. After switching off the current the remanent magnetism of the strip exerts a torque on the moving iron armature 2 and the pointer 4 moves to a place which is marked with 300 Amps. Similarly other points on the scale are determined.

No saturation was found in making a scale which shows a tenfold overload current. For measuring still higher loads I use a current transformer with a different ratio or I may use two instruments simultaneously, the second of which has a scale of 400–3000 Amps. The instrument described is very useful for supervising large A. C. plants in a manner that by using several instruments in a circuit, when an indication of abnormal current takes place it is easy to locate the location of the cause of the abnormal current, which must be between two instruments of which one shows abnormal current while the other does not.

This use of the instruments is very important for detecting and showing such instantaneous abnormal overloads as occur on transient break-down of a cable junction-box. A signal that is thereby obtained showing something is not in order in the circuit and the location of the trouble is determined before a more dangerous and damaging break-down occurs.

When a current transformer is not available it is advantageous to use an instrument according to the invention having an open iron core transformer and means to fix the instrument directly on the high or low tension wire, because no short-circuit proof current transformer and no special insulation are necessary in this case.

The demagnetisation of the strip 1 can be affected by using a transformer having an open iron core and an insulated handle.

The instrument is brought near such a transformer whereby the strip is exposed to the strong alternating magnetic strayfield of the transformer and after slowly removing the instrument the demagnetising of the remanence is effected and the instrument can remain under high tension as the demagnetising transformer is properly insulated.

The instrument described can be adapted for voltage measurements and can then be used to determine the rupturing capacity of a circuit breaker and similar purposes. It is arranged that a current passes through coils 5 which is proportional to the voltage in the circuit of the breaker under test. If such an instrument is inserted in the secondary circuit of the voltage transformer of the circuit breaker, then the pointer of the instrument will be deviated, up to the moment of breaking, by an amount corresponding to the maximum voltage value attained and, after breaking, it will be deviated by an amount corresponding to this value which has caused the remanence. The maximum current value attained can be measured on a separate instrument and from the two readings, the breaking capacity of the circuit breaker is obtained.

Certain parts of the invention may be mounted in a casing 15 for instance having a back wall 14. The pointer 4 is mounted on a shaft 3 which latter is mounted at 13 supported by the back wall 14 at one end and at the other end at 12. A coiled spring 10 on the shaft 3 and a fixed point returns the pointer 4 back to its original position.

While I have shown and described certain preferred embodiments of my invention I do not wish to be limited to the precise constructions disclosed since modifications in the structure and arrangement of parts may be resorted to without departing from the spirit of my invention.

What I claim is:

1. A magnetic vane type indicating instrument for measuring the maxima of abnormal transient, alternating current surges, comprising a core structure formed of high remanence material, and providing pole pieces and an air gap; an energizing winding therefor and interlinking said core structure; a magnetic vane armature pivoted in the air gap; a pointer and scale for indicating maximum deflections of the armature; and transforming means and a full wave rectifier interposed between the source of surge current and the energizing winding, whereby the rectifier is energized in accordance with the magnetic polarization induced therein by abnormal current.

2. A magnetic vane type indicating instrument for measuring the maxima of abnormal, transient, alternating current surges, comprising a core structure formed of high remanence material, and providing pole pieces and an air gap; an energizing winding therefor and interlinking said core structure; a magnetic vane armature pivoted in the air gap; a pointer and scale for indicating maximum deflections of the armature; and transforming means and a rectifier interposed between the source of surge current and the energizing winding, whereby the rectifier is energized in accordance with the magnetic polarization induced therein by abnormal current.

3. A magnetic vane type indicating instrument for measuring the maxima of abnormal, transient, alternating current surges, comprising a core structure formed of high remanence material in the form of a V-shaped steel strip, and providing pole pieces and an air gap; an energizing winding therefor and interlinking said core structure; a magnetic vane armature pivoted in the air gap; a pointer and scale for indicating maximum deflections of the armature; and transforming means and a full wave rectifier interposed between the source of surge current and the energizing winding, whereby the rectifier is energized in accordance with the magnetic polarization induced therein by abnormal current.

ERNEST REICH.